G. T. JOHNSON.
BALANCING MACHINE.
APPLICATION FILED MAY 2, 1919.

1,364,994.

Patented Jan. 11, 1921.
4 SHEETS—SHEET 1.

G. T. JOHNSON.
BALANCING MACHINE.
APPLICATION FILED MAY 2, 1919.

1,364,994.

Patented Jan. 11, 1921.
4 SHEETS—SHEET 2.

Witness:
Fed. Davison

Inventor:
Gustav T. Johnson
By Walter M. Fuller
Atty.

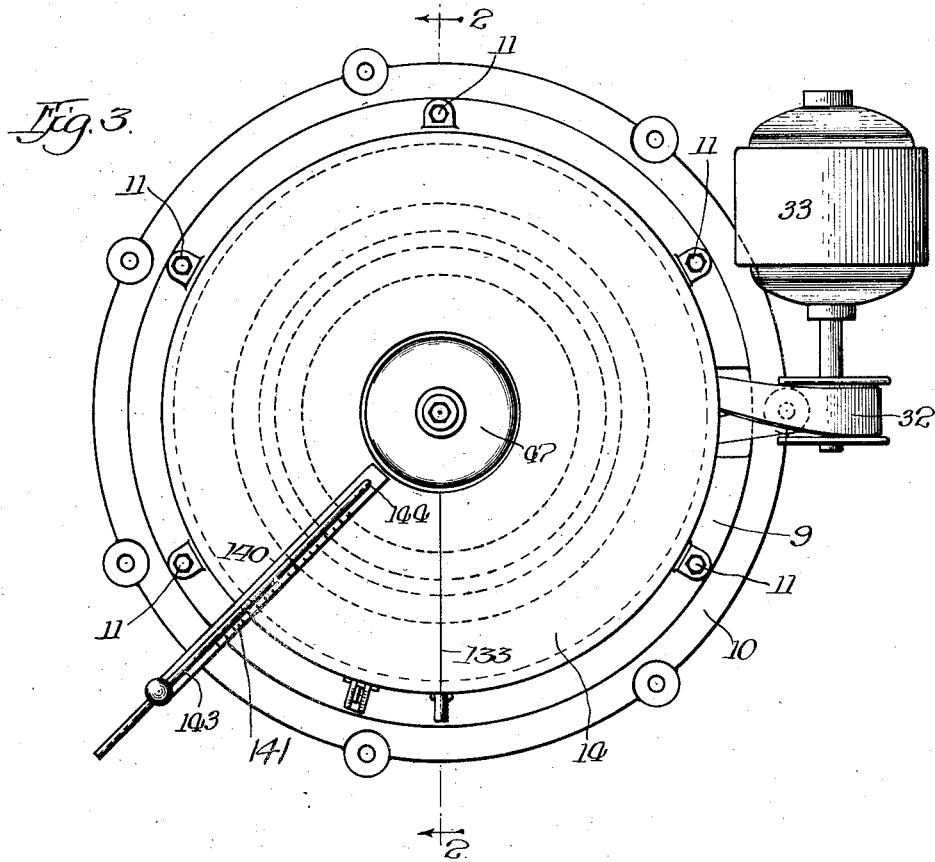
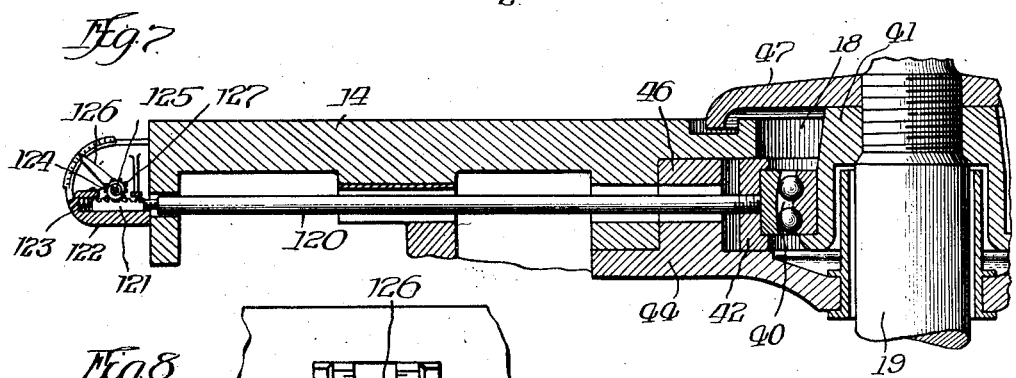
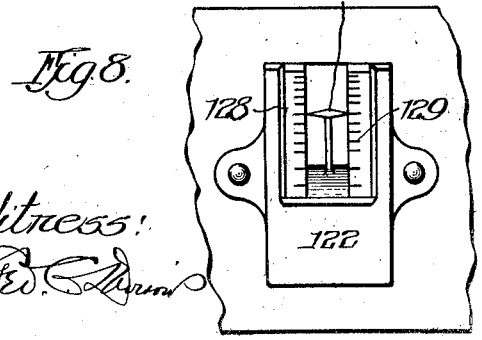

G. T. JOHNSON.
BALANCING MACHINE.
APPLICATION FILED MAY 2, 1919.
1,364,994.
Patented Jan. 11, 1921.
4 SHEETS—SHEET 4.
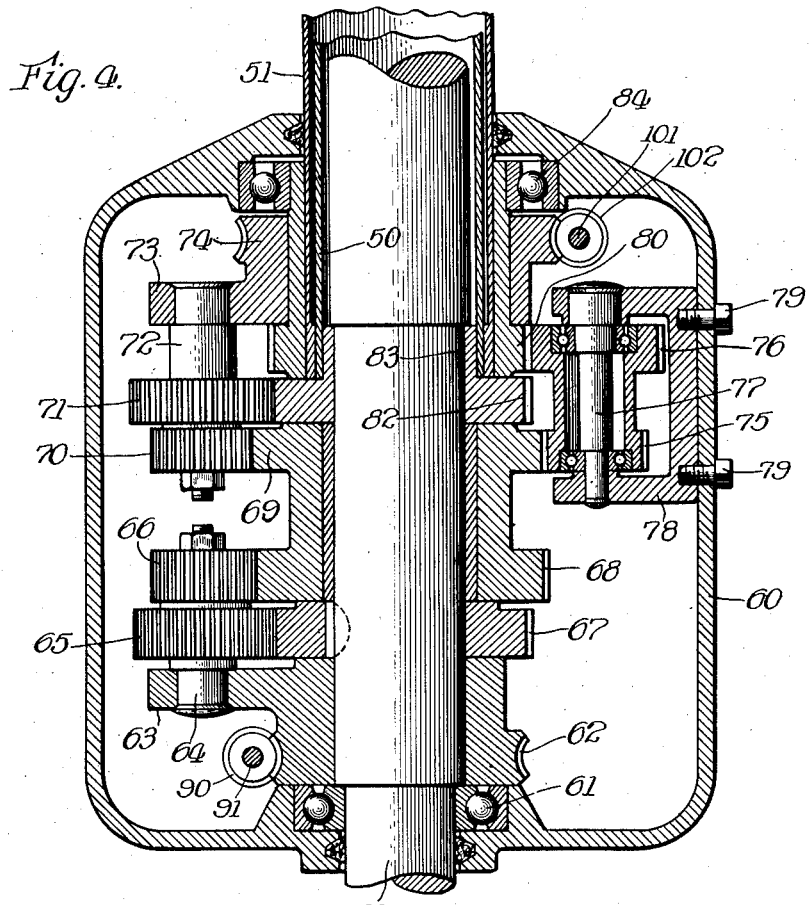
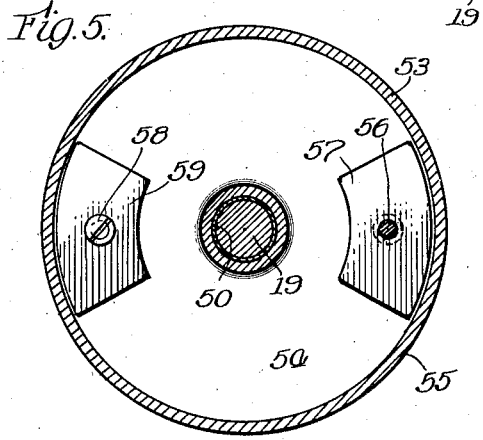
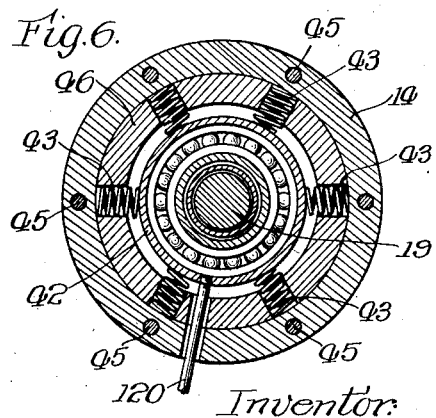
Witness:
Inventor:
Gustave T. Johnson
By Walter M. Fuller
Atty.

UNITED STATES PATENT OFFICE.

GUSTAVE T. JOHNSON, OF CHICAGO, ILLINOIS.

BALANCING-MACHINE.

1,364,994.　　　　　Specification of Letters Patent.　　Patented Jan. 11, 1921.

Application filed May 2, 1919. Serial No. 294,221.

*To all whom it may concern:*

Be it known that I, GUSTAVE T. JOHNSON, a subject of the King of Sweden, residing at Chicago, in the county of Cook and State of Illinois, have invented certain new and useful Improvements in Balancing - Machines, of which the following is a specification.

The provision of a simple, compact, reliably operative, and economically manufactured machine for the production of the dynamic balance of a tested rotating body constitutes the subject-matter of this invention, the appliance not only effecting the balance of the body by elements of the machine but also indicating the modification necessary in the distribution of its weight to secure the complete balance of the body within itself.

To this end the preferred embodiment of the invention comprises an upright shaft provided with an oscillatory step bearing at its lower end whereby its upper end carrying the body to be tested may wabble, or its axis travel in a circle, if the body is out of balance. Means are also included for rotating the shaft and body at different or graduated speeds so that when balanced for one speed the latter may be changed to determine whether or not it is in balance for such different or higher speed of revolution. The appliance includes a pair of weights mounted on and rotated by the shaft in combination with means to angularly adjust the weights about the axis of the shaft during the rotation of the latter, the tested body, and weights, whereby to vary the effective balance weight added to the shaft, means being also supplied to indicate the adjustment of such weights or their combined effective weight, which is that to be added to or removed from the body to provide the required dynamic balance.

In addition the device has means to turn the weights angularly about the axis of the shaft without disturbing their relation to one another, whereby to vary the angular position of such effective weight, its position being shown by a suitable index.

Having thus balanced the body by the use of these weights forming parts of the machine, by noting and interpreting the readings the exact amount and position of weight change to be incorporated in the body is ascertained, which weight modification may be effected after the body is removed from the appliance.

In order that those skilled in this art may have before them a practical incorporation of the invention in physical form, in the accompanying drawings forming a part of this specification, and throughout the various views of which like reference characters refer to the same parts, I have illustrated a preferred and desirable embodiment of the invention.

In these drawings:

Fig. 3 is a plan view of the machine;

Fig. 4 is a central vertical section through the gearing and its casing;

Fig. 5 is a horizontal section on an enlarged scale on line 5—5 of Fig. 2;

Fig. 6 is an enlarged horizontal section through the ball-bearing for the upper portion of the shaft;

Fig. 7 is a vertical radial section through the table top showing the indicator mechanism; and Fig. 8 is a face view of the indicator on an enlarged scale.

Figure 2:
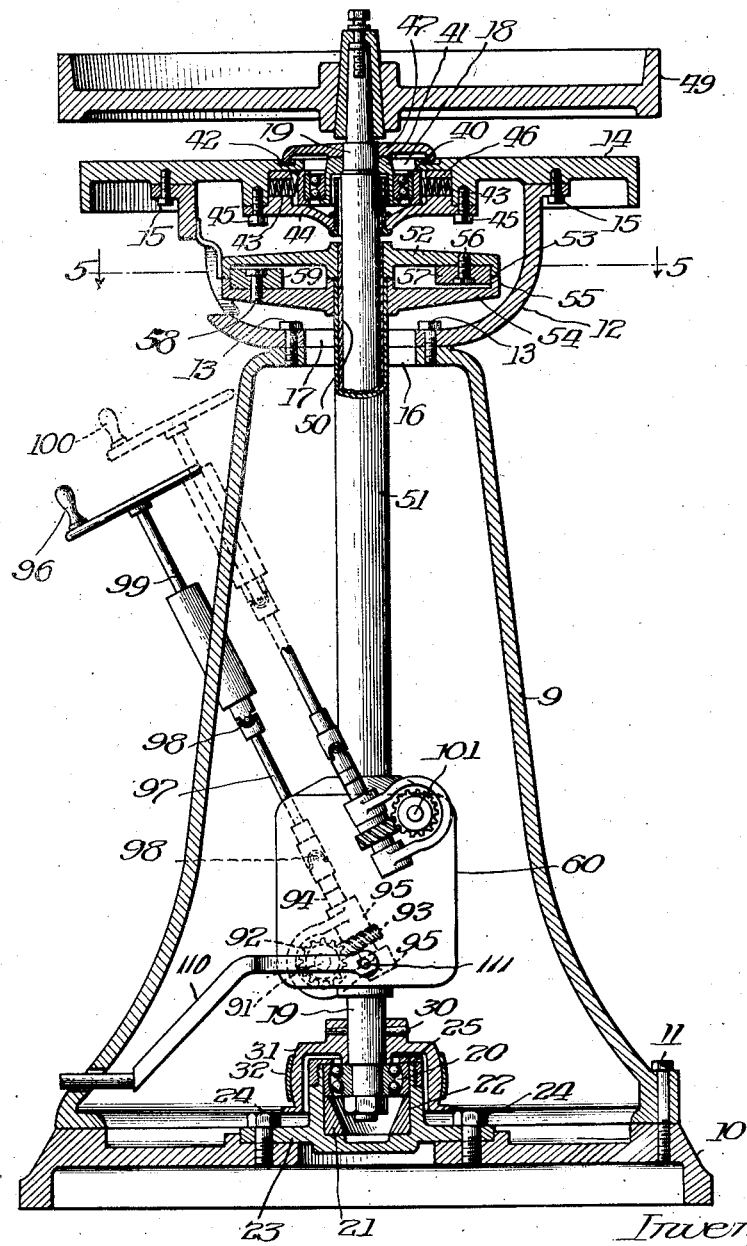
Fig. 2 is a central vertical section through the appliance, the body to be tested being shown in full lines.

Referring to the drawings it will be perceived that the appliance includes a hollow upwardly-tapered standard 9 of general conical shape resting on and secured by screws or bolts 11 to a suitable base 10. On this standard a cup-shaped member 12 is mounted by screws 13, 13 (Fig. 2) and on this member in turn is secured a round table-top or plate 14 by means of screws 15, 15, the table-top having a marginal depending flange.

All of these elements are centrally apertured in alinement at 16, 17, and 18 for the accommodation of a long, centrally-disposed, vertical shaft 19 equipped at its lower end with a supporting step ball-bearing 20 of any suitable construction permitting wabbling or rocking of the shaft about such bearing as a center. Such bearing is supported on a ring 21 resting in a round cavity 22 of a plate 23 fastened by screws 24 to the top of base 10, such cavity being formed by a depression in the plate and an upstanding marginal flange 25.

Secured to the shaft by a cross-pin 30 and inclosing the rim or flange 25, thereby housing or incasing the bearing, is a pulley 31 driven by a belt 32 connected to an electric motor 33, the speed of which is subject to control by a rheostat 34, shown conventionally. By reason of this construction the shaft may wabble or describe a circle at its upper end during rotation without disturbance of the belt driving mechanism, the center of drive being coincident with the rocking center of the bearing.

In order to yieldingly and revolubly mount such top end of the shaft and restrict the extent of its side play I provide it with a ball-bearing 40 on a collar 41 carried by the shaft. Surrounding and coöperating with such ball-bearing is a circular ring 42 backed up by a plurality of radially-disposed coil springs 43, the outer portions of which are received in cavities in a member 44 fastened by screws 45 to the under surface of the table-top 14, such member being centrally apertured for the extension of the shaft therethrough. As is shown, there is a limited lateral play between the ring 42 and the rib or flange 46 of member 44 in which the springs are housed in part. To protect these and other horizontal parts, the shaft has a cover-plate or shield 47 secured thereto just above the hub of the element 41. Above this the shaft is tapered at 48 and at that point adapted to detachably or demountably carry the pulley, wheel, or other element 49 to be balanced.

Surrounding the shaft 19 are an inner sleeve 50 and an outer sleeve 51, (Figs. 2 and 4) the former carrying a disk or plate 52 with a downwardly-extending, circular, marginal flange 53 (Fig. 2), the outer sleeve carrying a similar disk or plate 54 with a mating or registering upwardly-extended circular border flange 55 just below the companion flange 53. On its under face disk or circular plate 52 has mounted thereon a flat weight 57 by a screw 56, and disk or plate 54 has secured to its upper face by a screw 58 a similar weight 59 normally directly opposite and always in the horizontal plane of weight 57. Thus, under ordinary circumstances, these two weights exactly balance one another dynamically.

Means are provided for rotating these weights with the shaft and for angularly adjusting one of such weights relatively to the other about the axis of the shaft thereby in effect adding to the shaft an effective weight midway between the two. Means are also supplied for angularly adjusting both weights concurrently about the axis of the shaft without changing their adjusted relation to each other. In this way the body 49 may be dynamically balanced and the tendency of the shaft and body to wabble eliminated.

Such driving and adjusting means comprises mechanism in a casing 60 and associated operating means. This casing (Fig. 4) has a ball-bearing 61 at its lower end for the shaft 19 which extends therethrough and above this bearing the shaft has mounted and adapted to turn thereon a worm-wheel 62 with a radial arm 63 on which is mounted a pin or stud shaft 64 carrying a double gear 65, 66 of different diameters, the larger gear 65 being in mesh with a gear 67 keyed to the shaft, the smaller gear 66 meshing with one portion 68 of a double gear loose on the shaft, its other portion 69 meshing with a smaller gear 70 rigid with another larger gear 71, both being revoluble on a pin or stud shaft 72 on an arm 73 projecting radially from a revoluble worm-wheel 74, surrounding the main shaft and sleeves. Gear 69 also drives an idler 75 and its companion gear 76 rigid therewith, both being rotatable on a jack or counter shaft 77 mounted in a bracket 78 fastened inside the housing or casing 60 by screws 79, 79. Gear 76 is in coöperative relation with a gear 80 on a sleeve 81 in which the lower end portion of the outer sleeve 51 is fixedly secured, and on which sleeve 81 the worm-wheel 74 has its bearing. Gear 71 is in mesh with a gear 82 revoluble on the shaft 19, the hub 83 of such gear being fitted within and secured to the inner sleeve 50. In the upper part of the casing or housing a second ball-bearing 84 is provided for the part 81.

Worm-wheel 62 is operated by a worm 90 on a shaft 91 (Figs. 2 and 4) which is equipped outside of the casing with a spiral-gear 92 (Fig. 2) coacting with a companion spiral-gear 93 on a short shaft 94 supported in a yoke 95 encircling and adapted to rock slightly about the axis of shaft 91. A suitably-journaled, rotatable handle 96 at the front of the standard is adapted to turn the shaft 94 and the associated gearing by means of a connecting shaft 97 having universal connecting joints 98, 98 with the shafts 94 and 99 to the latter of which the handle is affixed.

By a like mechanism a second handle 100 is enabled to turn shaft 101 fitted with worm 102 (Fig. 4) meshing with the upper worm-wheel 74.

By means of this gearing shaft 19 rotates the two sleeves 50 and 51 and the disks 52 and 54 and their weights at the speed of and in the direction of rotation of the shaft. This is accomplished for the inner sleeve and its upper disk and weight by the following train of gearing-shaft 19 and gears 67, 65, 66, 68, 69, 70, 71 and 82, and for the outer sleeve and its lower disk and weight by shaft 19 and gears 67, 65, 66, 68, 69, 75, 76, and 80.

The turning of worm-wheel 74 by handle 100 will adjust the weight 57 on the upper disk angularly about the axis of the shaft relatively to the other weight 59 thereby adding an effective weight to the shaft midway between the two weights. It will be readily understood that when the two weights are exactly opposite one another they are in dynamic balance and counteract one another. The nearer one of such weights is turned toward the other the greater the effective weight which will be imposed on the shaft, the position of such component weight being always midway between the two. Such adjustment of the weights may be done while the parts are revolving. The turning of handle 96 and its worm-wheel 62 will angularly adjust both weights together about the axis of the shaft without changing their relations to one another.

In order to prevent the casing 60 from rotating with the shaft and yet permit it to rock or wabble with the latter, as is required, it is held from turning by a yoke 110 straddling its lower part and pivoted thereto at 111, such yoke having a straight cylindrical shaft portion or stem located in the horizontal plane of the step bearing 20 and positioned and adapted to slide slightly in a hole in the standard. As the casing wabbles it will rock at the points 111, 111 and the stem will turn and slide in its bearing in the standard.

In order to display with a great degree of accuracy the extent of sidewise movement or wabble of the upper end of the shaft and the body thereon being tested, an indicator is provided comprising a reciprocatory, suitably-supported rod 120 (Fig. 7) threaded at its inner end into the ring 42 and bearing at its outer end against a rack 121 slidable in a cavity in a bracket 122 fastened to the skirt of the table-top 14, such rack being pressed inwardly toward the shaft 19 by a coil-compression spring 123 between itself and the end of the recess. The teeth of said rack are in mesh with those of a pinion 124 on the shaft 125 of a pointer or index 126. If desired, this shaft may be equipped with a torsion spring 127 supplementing the action of spring 123. The index 126 is double ended, as shown in Fig. 8, and opposite each end is a )curved, graduated scale 128 and 129 with which the index coöperates.

Figure 1:
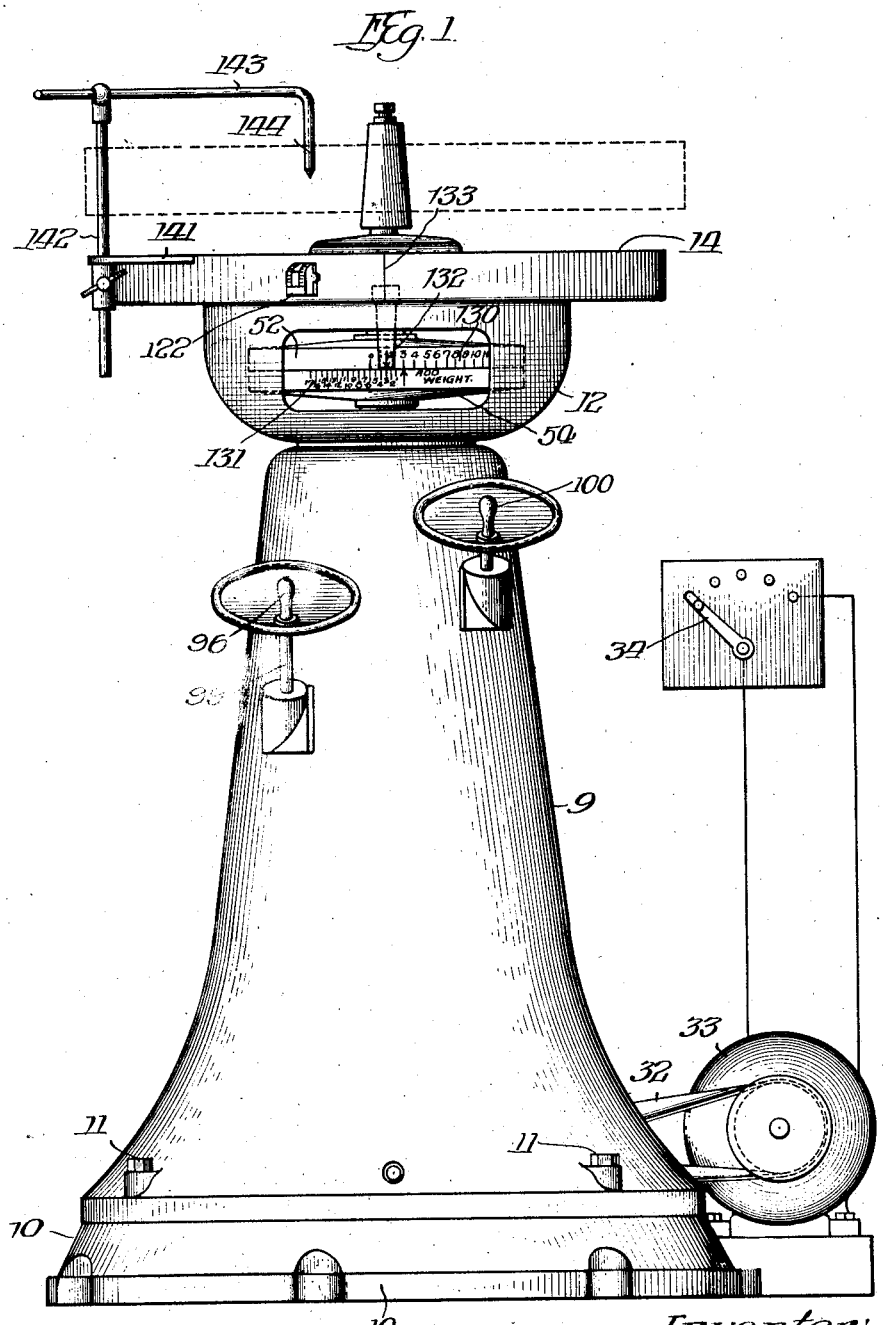
Figure 1 is a front elevation of the improved appliance, the body to be tested being shown in dotted lines.

As is shown in Fig. 1 the flange 53 is graduated in arbitrary units at 130 and the adjacent, registering, companion flange or rim 55 is graduated at 131 in the opposite direction with graduations which are spaced apart a distance exactly one-half of the graduations on the upper scale, all as is clearly shown in Fig. 1. These same graduations are duplicated on the opposite side of these rims (not shown) and the one set illustrated in Fig. 1 is supplied with the legend "add weight" and the other with the legend "subtract weight." In addition, at the front of the machine there is a stationary index 132 in front of and adapted to coact with these movable circular scales. Above this index the flange of the table has an index line 133, which if desired may extend radially across the table-top.

The table-top 14 is supplied with a radial groove 140 accommodating a graduated slide-bar 141 which carries an adjustable upright rod 142, the latter in turn carrying a bent rod 143 with a downwardly-extended pointer 144.

The operation of the appliance occurs practically as follows. The body to be tested, such as a pulley 49, is temporarily fixedly but detachably mounted on the upper end of the vertical shaft 19. Then the rheostat 34 is manipulated to cause the motor 33 to revolve the shaft and body at a relatively low speed, the upper end of the shaft and the body wabbling, that is to say their common axis describes a circle, by reason of the unbalanced condition of the latter, the extent of such sidewise movement being restricted by the ring 42 which has a limited lateral play by reason of the fixed spaced surrounding element or rib 46. The extent of sidewise movement of the shaft is indicated by the pointer 126 on the scale 128—129. When the machine is thus started in operation the two weights 57 and 59 are exactly opposite one another and hence balanced having no effect on the shaft and the body. During such rotation of the shaft, body, and weights the operator turns handles 96 and 100 until the shaft is balanced by the weights, it being understood that the value of the effective weight added is thus changed and its position relative to the body modified until it is in amount and position that required to exactly balance the shaft and body, that is to say, it eliminates the tendency of these parts to wabble. This condition is recognized when the pointer 126 remains stationary. Thereupon the speed of rotation is increased and the handles manipulated again until the wabble or unbalanced condition is done away with. The speed is again increased and the parts balanced, and this operation is continued until the desired or maximum speed is attained and the parts are in true and exact dynamic balance.

The operator then stops the machine and reads the indication on scale 130 as shown by the arrow or zero index of scale 131. We will assume this reading on the upper scale to be "3" as illustrated in Fig. 1. He then turns the shaft until the corresponding reading "3" on the lower scale 131 is in register with the stationary arrow or pointer 132. The line 133 just above the arrow or line 132 will then show the vertical plane of the pulley or wheel in which the weight should be added or subtracted depending upon which side of the center the weight modification is to take place. The tested body may be marked opposite line 133 to show the proper plane.

Scale 130 may be graduated in any suitable arbitrary units to be interpreted by reference to a prepared chart or table, which gives for the indicated reading various weight additions or subtractions for several radial distances from the center of the pulley, any suitable distance being chosen which will conveniently permit the weight change at that point.

The pulley is now turned to bring its marked plane into register with arm 143 and the latter and its supporting slide bar are moved in or out until the pointer 144 is directly over a suitable place for the application of the weight to be added or the removal of the excess weight. Then a reading is taken on the scale of bar 141 and reference made, as suggested above, to the chart referred to which will give the exact amount of weight modification needed to balance the pulley at that point corresponding to the position of the pointer. The pulley or other body is marked directly under the pointer and when the weight change is made thereat after removal of the pulley from the machine, such pulley will be perfectly balanced.

While I have herein set forth one particular embodiment of the invention it is to be understood that it is susceptible of a variety of embodiments varying materially in structural features but all working upon the same general underlying principles. The invention, therefore, is not limited and restricted to the precise and exact structural details presented since these may be changed within comparatively wide limits without departure from the substance and essence of the invention and without the sacrifice of any of its substantial benefits and advantages.

I claim:

1. In a balancing machine of the character described, the combination of an upright shaft adapted to revolve the body to be tested, a relatively-stationary mounting for said shaft permitting the latter and the body to wabble, means to rotate said shaft and body, and means to neutralize the wabble of said shaft and body having means to indicate the amount of weight to be added to or removed from said body to balance it, substantially as described.

2. In a balancing machine of the character described, the combination of an upright shaft adapted to revolve the body to be tested, a relatively-stationary mounting for said shaft permitting the latter and the body to wabble, means to rotate said shaft and body, means to neutralize the wabble of said shaft and body, and means to indicate the extent of wabble of said shaft and body, substantially as described.

3. In a balancing machine of the character described, the combination of an upright shaft adapted to revolve the body to be tested, a relatively-stationary mounting for said shaft permitting the latter and the body to wabble, means to rotate said shaft and body, and means to neutralize the wabble of said shaft and body having means to indicate the position of the weight to be added to or removed from said body to balance it, substantially as described.

4. In a balancing machine of the character described, the combination of an upright shaft adapted to revolve the body to be tested, a relatively-stationary mounting for said shaft permitting the latter and the body to wabble, means to rotate said shaft and body, means to neutralize the wabble of said shaft and body having means to indicate the amount and position of the weight to be added to or removed from said body to balance it, substantially as described.

5. In a balancing machine of the character described, the combination of an upright shaft adapted to revolve the body to be tested, a relatively stationary mounting for said shaft permitting the latter and the body to wabble, means to rotate said shaft and body, means to neutralize the wabble of said shaft and body having means to indicate the amount and position of the weight to be added to or removed from said body to balance it, and means to vary the speed of rotation of said shaft and body, substantially as described.

6. In a balancing machine of the character described, the combination of an upright shaft adapted to revolve the body to be tested, a relatively-stationary mounting for said shaft permitting the latter and the body to wabble, means to rotate said shaft and body, means to neutralize the wabble of said shaft and body having means to indicate the amount of weight to be added to or removed from said body to balance it, means to indicate the extent of wabble of said shaft and body, and means to vary the speed of rotation of said shaft and body, substantially as described.

7. In a balancing machine of the character described, the combination of an upright shaft adapted to carrying the body to be tested, a mounting for said shaft and body permitting them to wabble, means to rotate said shaft and body, a pair of weights carried by and rotatable about the axis of said shaft, and means to adjust said weights angularly with respect to one another in a plane perpendicular to the axis of the shaft to vary the effective weight applied to the shaft, substantially as described.

8. In a balancing machine of the character described, the combination of an upright shaft adapted to carry the body to be tested, a mounting for said shaft and body permitting them to wabble, means to rotate said shaft and body, a pair of weights carried by and rotatable about the axis of said shaft, and means to adjust said weights angularly with respect to one another in a plane perpendicular to the axis of the shaft during the rotation of the shaft and weights to vary the effective weight applied to the shaft, substantially as described.

9. In a balancing machine of the character described, the combination of an upright shaft adapted to carry the body to be tested, a mounting for said shaft and body permitting them to wabble, means to rotate said shaft and body, a pair of weights carried by and rotatable about the axis of said shaft, means to adjust said weights angularly with respect to one another in a plane perpendicular to the axis of the shaft to vary the effective weight applied to the shaft, and means to adjust said weights about the axis of the shaft without disturbing their relation to one another, substantially as described.

10. In a balancing machine of the character described, the combination of an upright shaft adapted to carry the body to be tested, a mounting for said shaft and body permitting them to wabble, means to rotate said shaft and body, a pair of weights carried by and rotatable about the axis of said shaft, means to adjust said weights angularly with respect to one another in a plane perpendicular to the axis of the shaft during the rotation of the shaft and weights to vary the effective weight applied to the shaft, and means to adjust said weights angularly about the axis of the shaft without disturbing their relation to one another and during the rotation of the shaft and weights, substantially as described.

11. In a balancing machine of the character described, the combination of an upright shaft adapted to carry the body to be tested, a mounting for said shaft and body permitting them to wabble, means to rotate said shaft and body, means to vary the speed of rotation of said shaft and body, a pair of weights carried by and rotatable about the axis of said shaft, means to adjust said weights angularly with respect to one another in a plane perpendicular to the axis of the shaft during the rotation of the shaft and weights to vary the effective weight applied to the shaft, and means to adjust said weights angularly about the axis of the shaft during the rotation of the shaft and weights without disturbing their relation to one another, substantially as described.

12. In a balancing machine of the character described, the combination of an upright shaft adapted to carry the body to be tested, a mounting for said shaft and body permitting them to wabble, means to rotate said shaft and body, a pair of weights carried by and rotatable about the axis of said shaft, means to adjust said weights angularly with respect to one another to vary the effective weight applied to the shaft, and means to indicate the amount of wabble of the shaft and body, substantially as described.

13. In a balancing machine of the character described, the combination of an upright shaft adapted to carry the body to be tested, a mounting for the lower end of said shaft permitting its upper portion to wabble, means to revolve said shaft and body, means to eliminate the tendency of the shaft and body to wabble, means to indicate the amount of weight to be added to or subtracted from the body to effect its dynamic balance and to indicate the plane of such weight modification, substantially as described.

14. In a balancing machine of the character described, the combination of a shaft adapted to carry the body to be tested, a mounting for said shaft permitting wabbling of the shaft and body, an inner sleeve on said shaft, a weight on said sleeve, an outer sleeve surrounding said inner sleeve, a second weight on said outer sleeve, and means to drive said sleeves from said shaft and to permit angular adjustment of said weights including a casing surrounding the sleeve, means to permit wabbling of said casing with the shaft but preventing rotation of the casing, and gearing in said casing between said shaft and sleeve and in part mounted on said casing, substantially as described.

15. In a balancing machine of the character described, the combination of an upright shaft adapted to carry the body to be tested, a rockable stepped bearing for the lower end of said shaft permitting the upper end of the shaft to wabble, a horizontal pulley on said shaft with a center coincident with the turning center of said stepped bearing, a casing surrounding said shaft, means to permit said casing to wabble with said shaft but prevent rotation of the casing with the shaft, comprising a member having a pivotal connection with said casing and a turning and sliding connection with a stationary part of the machine, and means to balance the body during its rotation with the shaft, substantially as described.

16. In a balancing machine of the character described, the combination of an upright shaft adapted to carry the body to be tested at its upper end, a rockable stepped bearing for the lower end of said shaft permitting the upper portion of the shaft and the body to wabble, means to rotate said shaft and body, an inner sleeve on said shaft, a disk fastened to said sleeve, a weight on said disk, an outer sleeve surrounding said inner sleeve, a second disk on said outer sleeve, a second weight on said second disk, said disks having mating graduated portions with the graduations on the one part half the size of those of the other, and means to rotate said sleeves with said shaft and to permit adjustment of said sleeves and weights angularly about the axis of the shaft, substantially as described.

17. In a balancing machine of the character described, the combination of an upright shaft adapted to carry the body to be tested at its upper end, a rockable stepped bearing for the lower end of said shaft permitting the upper portion of the shaft and the body to wabble, means to rotate said shaft and body, an inner sleeve on said shaft, a disk fastened to said sleeve, a weight on said disk, an outer sleeve surrounding said inner sleeve, a second disk on said outer sleeve, a second weight on said second disk, said disks having mating graduated portions with the graduations on one portion half the size of those of the other, means to rotate said sleeves with said shaft, means to adjust said sleeves and weights angularly about the axis of the shaft, and an index on a stationary part of the machine in coöperative relation with the graduations of said disks, substantially as described.

18. In a balancing machine of the character described, the combination of an upright shaft adapted to carry the body to be tested at its upper end, a mounting for the lower end of said shaft permitting its upper end and the body to wabble, means to rotate said shaft and body, means to eliminate the tendency of said shaft and body to wabble, a table-top, a graduated radial slide on said table-top, and an overhanging arm equipped with a pointer carried by said slide, substantially as described.

GUSTAVE T. JOHNSON.